United States Patent Office 3,348,904
Patented Oct. 24, 1967

3,348,904
PAPER PARCHMENTIZED WITH
ORTHO-PHOSPHORIC ACID
Edward L. Taylor, Allegan, Mich., assignor to Brown
Company, a corporation of Delaware
No Drawing. Filed Feb. 12, 1964, Ser. No. 344,180
1 Claim. (Cl. 8—119)

The present invention relates to the parchmentization of cellulose materials by a novel process and to parchmentized products thus produced, and is more particularly concerned with the parchmentization of cellulose employing concentrated ortho-phosphoric acid as parchmentizing agent and with the high grade or quality parchment produced by the said process, having the advantage of increased opacity and heat resistance, diminished tendency to curl, and an excellent desirable white color. In a preferred embodiment of the invention, it is directed to the preparation of parchmentized cellulose containing integrally interbonded parchmentized cellulose fibers which are not indigenous to the main body of cellulose subjected to parchmentization, which type of parchmentized cellulose is characterized by additional advantages over previously known parchment materials. The invention is moreover directed to such type of improved parchment product, to a process adaptable to its production on a commercial scale, and to parchmentizing media useful in its production.

Some of the numerous objects of this invention are:

First, to provide parchmentized products which have substantially increased opacity and heat resistance, diminished tendency to curl, and other advantages when compared to parchmentized products heretofore in use.

Second, to provide a method of producing parchmentized products having such advantages as well as improved tear and dry burst resistance.

Third, to provide a method of producing parchmentized products having these advantages or qualities which may be practiced on machines or apparatus of the type now used in the production of parchmentized paper.

Fourth, to provide a method of parchmentizing paper and parchmentized paper having these several advantages which may be economically produced.

Fifth, to provide parchmentized fibers in sheet form, produced by the employment of concentrated ortho-phosphoric acid as parchmentizing agent, and a process for producing the same.

Sixth, to provide a parchment product, e.g., parchmentized paper, containing integrally interbonded parchmentized cellulose fibers which are non-indigenous to the main body of the cellulose material subjected to parchmentization, which is characterized by a high degree of opacity, a blueish-white hue, increased resistance to tear and dry burst, improved heat resistance, and diminished tendency to curl, which is produced by subjecting the cellulose material to a concentrated ortho-phosphoric acid parchmentization reaction medium containing added cellulose fibers.

Seventh, to provide a parchment product, e.g., parchmentized paper, produced by subjecting cellulose material to concentrated ortho-phosphoric acid as parchmentizing agent, which is characterized by a high degree of opacity, improved heat resistance, and diminished tendency to curl.

Eighth, to provide a parchmentizing reaction medium comprising concentrated phosphoric acid and added cellulose fibers in a concentration of about one-tenth to two percent by weight based on the weight of the ortho-phosphoric acid, at least some of which cellulose fibers are dissolved in said ortho-phosphoric acid and the remainder of which are suspended in said ortho-phosphoric acid.

Objects relating to details and economics of the invention will appear from the description to follow, and still others will be apparent to one skilled in the art. The invention is defined and pointed out in the claims.

Parchmentizing has long been practiced in the paper industry and parchmentized cellulose, e.g., parchmentized paper, products have long been known. One of the greatest disadvantages of existing parchmentized paper products, especially sheets thereof, has been their tendency to curl at the edges, especially upon periods of storage or exposure to humidity, thereby making their dimension-retention factor considerably less than optimum and resulting in the necessity of producing parchment sheets of a size in excess of that actually desired to take into account the curling factor, which frequently requires a substantial amount of trimming and waste, careful control of temperature and humidity during storage, and compression to restore or retain the original sheet form. This tendency to curl, which has been characteristic of parchment sheets produced by previously known processes, is substantially completely obviated by the process and in the products of the present invention.

In addition, parchment sheets produced according to the process of the present invention show an increased heat resistance and opacity over parchment produced by previously known methods, said opacity being substantially equivalent to that of the original waterleaf paper introduced into the parchmentizing process. The parchment products of the invention, moreover, exhibit an attractive white color which is considerably more toward the white or bluish-white than parchment produced by previously known methods. In other characteristics and attributes, the parchment products of the present invention produced in the absence of added cellulose in the parchmentizing solution are, for all practical purposes, substantially equivalent to parchment produced by previously known processes.

The parchment products of the present invention produced in the presence of added cellulose, that is, added to the parchmentizing medium, are characterized by the presence of integrally interbonded parchmentized cellulose fibers which are not indigenous to the main body of cellulose material, e.g., paper sheet, subjected to the parchmentization process. The interbonded fibers are likewise not indigenous to the parchmentized sheet, but are integrally interbonded with the fibers thereof. Such product is characterized by all of the advantages of a parchment product produced in the absence of added cellulose and in additionally characterized by an even greater increase in opacity and whiteness, a substantial increase in tear resistance and dry burst, as well as an even smaller tendency to curl.

If there is any disadvantage in applicant's parchment products, it is that they exhibit a decrease in wet burst resistance over parchment produced by previously known procedures. However, this is in reality no disadvantage of practical consequence, but only in such applications as involve exposure to stress while submerged in or exposed to water over an extended period, which conditions exist in only a negligible area of the field of applications in which parchment is presently employed.

The present invention therefore provides parchment products which are indeed superior to and advantageous over known parchment products produced by previously known parchmentizing procedures, a convenient and facile process for their production, and the parchmentization medium whereby the preferred parchment products having integrally interbonded non-indigenous parchmentized cellulose fibers are produced.

The prior art relating to parchmentizing agents has been excellently summarized by E. Becker in Zellenstoff u. Papier 19, No. 7 at pages 409–411 (July 1939) and as abstracted in the B.I.P.C., 9, No. 12, at page 564 (August 1939). In this summary, the author points out that suitable parchmentizing agents are sulphuric acid and zinc chloride, and that other agents such as calcium thiocyanate, hydrofluoric acid, and cuprammonium complex have been proposed but have not been accepted in practice. The author also points out that parchmentizing involves not only the swelling of the individual cellulose fibers but also the bonding of the fibers which is necessary to produce the parchmentized paper, and that some reagents which produce swelling similar to that observed with sulphuric acid or zinc chloride are nevertheless completely ineffective so far as producing the requisite bonding of fibers necessary to produce a parchment paper. Thus, parchmentizing agents in the past have been limited to the several materials mentioned, with the only practical parchmentizing agents being the zinc chloride solution and sulphuric acid, which apparently have been considered unique in their effect upon cellulose to form the particular chemical product (cellulose hydrate) known as parchment. Of these reagents, sulphuric acid has been greatly preferred from the standpoint of practical facility of operation.

For this reason, it is now the general practice to use so-called waterleaf paper (which paper is water-absorbent) in parchmentizing by the so-called sulphuric acid method. Applicant has long been familiar with that method and with the character of the parchmentized paper produced by that method, and that method has long been practiced commercially.

The applicant's attained objective is to improve the opacity, color, and heat resistance and to decrease the curling tendency of the parchmentized paper, and parchmentized paper having these several advantages as well as others may be produced by the applicant's method.

The process of the present invention generally comprises the steps of subjecting sheet-form cellulose material to be parchmentized, in any desirable or convenient form, e.g., a paper sheet or other non-woven web such as made on a paper machine or by any conventional papermaking equipment, but preferably waterleaf paper in sheet form, to a solution of concentrated ortho-phosphoric acid as parchmentizing agent, the acid concentration being at least about eighty percent, and preferably about eighty-five percent ortho-phosphoric acid. Unless the cellulose is extremely dry, about eighty-five percent phosphoric acid is ordinarily required. While reference is herein made to ortho-phosphoric acid as the parchmentizing agent, it will be apparent that meta-phosphoric acid is ortho-phosphoric acid minus one molecule of water, and that pyrophosphoric acid is two molecules of ortho-phosphoric acid minus one molecule of water and that, upon standing in the presence of water, meta-phosphoric acid is formed from pyrophosphoric acid and in turn converts into ortho-phosphoric acid. While the specification and claims of this application are directed to the employment of ortho-phosphoric acid, it should be understood that minor amounts or even substantial quantities of the ortho anhydrides pyro- or meta-phosphoric acid are not particularly disadvantageous if present in the parchmentizing medium and that ortho-phosphoric acid formed from pyro-, meta-, or even hypo-phosphoric acid in situ in the parchmentizing medium, or in fact from any other material in situ in the parchmentizing medium, is entirely within the contemplation, spirit and scope of the present invention. However, the phosphoric acid must be substantially pure, that is, free from other interfering acids, and particularly sulfuric acid. This requirement results from the fact that sulfuric acid reacts extremely rapidly with cellulose. The normal parchmentizing period with sulfuric acid is about three seconds. If a period substantially greater than this were to be used with sulfuric acid, and particularly one as long as fifteen seconds, the cellulose would become completely charred and worthless. Even small amounts of strong acids such as sulfuric acid, when used in conjunction with phosphoric acid, act substantially in the same manner as sulfuric acid alone, and char the cellulose if a contact time of as great as fifteen seconds is used.

According to the invention, the length of time the cellulose material is exposed to the phosphoric acid parchmentizing agent (contact time) is quite critical, the particular length of time utilized within the critical range being determined by the degree of parchmentizing desired. By "contact time" as used herein is meant the time between that moment at which the cellulose treated first contacts the phosphoric acid and that moment at which it first contacts the water wash, that being the period during which the cellulose is exposed to the action of the parchmentizing acid. Thus, commercially, exposure to the parchmentizing agent by submergingly translating a web of paper to be parchmentized therethrough must be effected at a speed which results in contact of the paper with the solution for a period of at least approximately fifteen seconds, usually fifteen to sixty seconds, and preferably twenty to forty seconds, depending again to some extent upon the thickness of the web (which is normally of a caliper between about 1.0 and 6.0 mils, or about .001 to .006 inch thick), concentration of parchmentizing agent, and degree of parchmentization desired, and an exposure by contact with the parchmentizing solution for a period of from twenty to forty seconds is a sufficient and preferred reaction period for most practical purposes. Of course, this may be varied within the somewhat broader limits according to conventional procedure for parchmentization depending upon the varied reaction conditions, depth of parchmentization or other effects desired to be produced by the process. The temperature of the parchmentizing solution, even at minimal contact times, should be no greater than about 128° F. to avoid deterioration. After a sufficient period of exposure to the parchmentizing agent, the parchmentized cellulose is washed to remove residual acid, as with a water bath or spray and dried, as with dry air, steam rollers, infra-red light, or even with a gas flame, all according to conventional procedure.

Although the employment of phosphoric acid as parchmentizing agent results in great improvement of the aforementioned characteristics of the parchment product, the addition of cellulose into the parchmentizing solution or reaction medium enhances the desirable characteristics of the parchment products still further, as already disclosed in the foregoing. According to this preferred embodiment of the process, cellulose fibers are dissolve in the parchmentizing solution or reaction medium, prior to the subjecting of the cellulose material, e.g., waterleaf paper, in the form of a sheet or web, to the parchmentizing procedure. Depending upon the amount of cellulose added to the parchmentizing medium, it will either all or nearly all be in solution or partially in solution and partially dispersed or in suspension in the parchmentizing reaction medium. It is doubted that the added cellulose ever goes into 100% complete solution in the parchmentizing agent. The added cellulose may be reduced in size to the extent possible prior to introduction into the parchmentizing solution in order to facilitate more rapid solution therein, and upon introduction may preferably be thoroughly and uniformly mixed with the parchmentizing agent. Whereas it has been found that a ratio of about three to six grams of added cellulose to each approximately 550 cc. of ortho-phosphoric acid gives optimum results when a web of paper is submergingly translated into or through the parchmentizing reaction medium for a period of approximately fifteen to sixty seconds, preferably twenty to forty seconds, it is apparent that the amount or percentage of dissolved cellulose in the parchmentizing reaction medium may be varied over considerably broader ranges. The amount of added cellulose may, for example, constitute from approximately one-tenth to two percent, preferably about five-tenths to six-tenths percent, by weight of the parchmentizing agent, depending of course upon the precise effect desired and upon the exact concentration of acid and time of exposure of the cellulose material, e.g., the web of paper, to the parchmentizing reaction medium, which as previously stated can be at least about fifteen, usually fifteen to sixty, and preferably from twenty to forty seconds. It will be apparent from this specification and the examples that the employment of added cellulose in the ortho-phosphoric acid parchmentziation medium of the invention is particularly advantageous due to its relatively high degree of solubility in the phosphoric acid and the resulting cooperative effect of the ortho-phosphoric acid and the added cellulose in the production of parchment products having desirably enhanced strength, color, and opacity characteristics. If this amount of added cellulose is introduced into concentrated sulfuric acid, however, the product has a yellow-white color and not the desired white to blue-white color attained by the present invention, quite understandably since a yellow-white color is obtained even when using sulfuric acid without added cellulose.

The following examples are given by way of illustration only, and are not to be construed as limiting.

In all of the runs conducted utilizing parchmentizing agents according to the invention, the exposure or contact time of the cellulose web to the parchmentization medium (i.e., time from introduction until water rinse) was the same, about *thirty* seconds. The comparative tests utilizing sulfuric acid were conducted with an exposure or contact time of about *three* seconds, which has been determined to be optimum for sulfuric acid. A comparison of the characteristics of the parchment products produced according to the method of the present invention and according to the usual sulfuric acid process can be made from the Tables I and II included in Examples 2 and 3 and certain comparisons are summarized in Tables III and IV.

EXAMPLE 1

Normal parchmentizing solution was prepared and consisted of 50° Baumé sulfuric acid at 18° C.

Parchmentizing solution A according to the present invention was prepared and consisted of pure 85% ortho-phosphoric acid at 18° centigrade, having a specific gravity of 58.75–59.2° Baumé and a water-white color.

Parchmentizing solution B according to the present invention was prepared from five to six grams of cellulose dissolved in 550 cc. of 85% ortho-phosphoric acid (58.75° Baumé) at 18° centigrade in the following manner:

Cold 85% ortho-phosphoric acid (550 ccs.) was stirred vigorously and five to six grams of cellulose added slowly thereto. The mixture was agitated in various cases with either a Waring Blendor or a Miniature Effenbach mixer, in either case producing a high shear, until the cellulose was dissolved or fully dispersed in the acid, which generally required about five minutes of stirring. The temperature was maintained below about 20° centigrade while the mixture was being effected. When the solution was not to be used immediately after preparation, it was refrigerated at 0° centigrade (32° Fahrenheit) until used in the parchmentizing process. The viscous, opaque parchmentizing solution thus-produced was stored under refrigeration for periods of time exceeding one week without any apparent loss in effectiveness.

EXAMPLE 2

A small parchment machine approximating the functions of a commercial machine was devised and comprised an upwind stand, a suitable reaction vessel containing parchmentizing solution, a wringer, and a suitable water bath equipped with running cold water and overflow pipe.

Machine-made 26-pound F.S.[1] waterleaf was obtained in rolls six inches wide. A roll was mounted on the unwind stand, submergingly translated through the parchmentizing solution, run through the wringer producing the effect of commercial squeeze rolls, and then into the running water bath. The parchment products produced were washed in cold water for a minimum time of four hours, neutralized in the usual basic two to five percent ammonium hydroxide solution for one hour (compared with a solution pH of about 9 on a production scale), washed and then dried on a pulp drier drum (Noble and Wood). The drum was a water-heated (180° F.) revolving drum with felt cover. The parchment products were exposed to the hot drum on one side only, which situation ordinarily induces severe curl in normal parchment. The resulting sheets were then compared for physical and optical properties under standard conditions.

Machine-made sheets were also hand-dipped in the normal sulphuric acid parchmentizing solution (53° Baumé—18° centigrade). These hand-dipped sheets were then tested and compared to the sheets obtained from the laboratory parchmentizing machine. The results were comparable and indicated that the sheets produced from the laboratory parchment machine could properly be regarded as "standard parchmentized sheets," although of course not correlating precisely with the parchment which is produced using production model parchment machines. The hand-dipped parchment control likewise failed to correlate entirely with strength factors of parchment as it is produced on production parchment machines, and is included only as an approximate standard of reference. In actual production, the strength factors are considerably greater.

The data from the laboratory experiments is summarized in Table I. The burst test reported herein (wet or dry) was that usually employed in the paper industry, the

[1] F.S. means "Free Stock," indicating paper stock which freely releases water.

Table I.—A comparison of parchment made from 26# F.S. waterleaf (machine made) using various parchmentizing solutions. Time of parchmentizing; ca. 3 seconds for sulfuric acid and ca. 30 seconds for Type A and Type B liquors

| Tests on— | (1) Parchment Control | (2) Normal Parchment | (3) A Parchment | (4) B Parchment |
|---|---|---|---|---|
| Method of Parchmentizing | Handdip | Laboratory machine. | Laboratory machine. | Laboratory machine. |
| Parchmentizing liquor | Normal liquor 53° Bé. | Normal Liquor 53° Bé. | A Liquor | B Liquor. |
| Basis wt. of | 27.4 | 27.3 | 25.6 | 26.3. |
| Dry Burst | 22.0 | 21.2 | 21.0 | 23.4. |
| Wet Burst | 6.0 | 4.0 | 3.0 | 3.4. |
| Tear of 16 (AMD)[1] | 13.6 | 13.0 | 13.0 | 23.6. |
| Color | Yellow-white | Yellow-white | Blue-white | Blue-white. |
| Opacity | 32 | 30 | 39 | 52. |
| Width Before Parchmentizing | 6″ | 6″ | 6″ | 6″. |
| Width After Parchmentizing | 5½″ | 5⅝″ | 5¾″ | 5¹⁵⁄₁₆″. |
| Amount of Curl | Severe | Severe | Moderate | Very slight. |
| TAPPI Grease proofness in seconds | | Approximately equivalent | | |
| Dry Burst after 10 min. at 460° F | 0 | 0 | 2.0 | 4.0. |

[1] AMD indicates across the machine direction.

Mullen test (Tappi T403), the results being given in relative units. The tear test employed was the Elmendorf tear test (Tappi 414m49), which gives results in average force in grams to tear a sheet by measuring the work done in tearing a number of sheets together through a fixed distance after the tear has been started.

From the foregoing Table I, it will be observed that both A parchment and B parchment according to the present invention exhibited a blue-white hue compared to the yellow-white hue of the parchment produced from the normal parchmentizing liquor. It will also be observed that the opacity of both products A and B of the present invention was considerably greater than that of the parchment produced according to the normal sulphuric acid procedure. Both parchment products of the invention exhibited a much greater heat resistance than normal parchment, showing an infinitely better dry burst resistance after being heated for ten minutes at 460° F. The degree of curl tendency of the products of the invention was negligible compared to that exhibited by the normal parchment. For all practical purposes, the other characteristics of the A parchment of the present invention were substantially the same as those of the normal parchment, except for a reduction in wet burst resistance, while the B parchment of the present invention exhibited an increase in dry burst resistance and a considerable increase in tear resistance, although also a decrease in wet burst resistance.

It is evident from the tabulated data that the new parchmentizing process of the invention yields, in general, a superior parchment product with the sole exception being in the wet burst strength factor.

EXAMPLE 3

Handsheets were made from disintegrated F.S. waterleaf and from unbeaten Bl KVP J.P.[2] These handsheets were then stapled together and run through the laboratory parchment machine described in Example 2. The sheets were then rinsed and dried in the manner reported in Example 2.

One-third of the handsheets of a particular stock were tested before any treatment whatever, one-third were made into normal parchment and then tested, and one-third were made into parchment using parchmentizing liquor B as identified in Example 1 and then tested. All tests were made under standard conditions. The results are summarized in Table II, the parchmentization time being approximately three seconds for the sulfuric acid parchmentizing agent and about thirty seconds for the phosphoric acid parchmentizing agent of the invention.

The data from the foregoing Tables I and II are analyzed in following Tables III and IV. Table III compares B parchment and normal parchment made from F.S. waterleaf handsheets according to the data appearing in Table II.

In Tables III and IV, the formula employed was as follows: Strength characteristic of B parchment minus strength characteristic of normal parchment divided by strength characteristic of normal parchment multiplied by 100=percent. Thus, a plus sign indicates that the B parchment is a certain percent stronger than the normal parchment, while a negative sign indicates that the B parchment is that percent weaker than the normal parchment with which it is being compared.

*Table III.—B parchment vs. parchment (paper machine F.S. waterleaf base stock)*

|  | Percent |
|---|---|
| Dry burst | +10 |
| Wet burst | −15 |
| Tear | +74 |
| Opacity | +74 |

*Table IV.—B parchment vs. parchment (disintegrated F.S. waterleaf base stock)*

|  | Percent |
|---|---|
| Dry burst | +22 |
| Wet burst | −8 |
| Tear | +120 |
| Opacity | +54 |

The significance of Tables III and IV is that they show in every instance, except that of wet burst, that the new B parchment is a far superior parchment sheet independent of the factors of sheet formation or type of fiber involved.

In other runs, both the A parchment and the B parchment showed the same or greater superiority over normal parchment as to strength, heat resistance, tendency to curl, and opacity as indicated in the foregoing, quite independent of the type of sheet from which made or the type of cellulose fiber employed in such starting sheet.

EXAMPLE 4

Three samples of 27 lb. waterleaf paper were parchmentized on commercial parchmentizing apparatus utilizing parchmentizing solution A, described above. The contact time between the waterleaf and the parchmentizing solution was about thirty seconds. The acid wet paper was passed between rollers and into a running water bath to remove residual acid. The samples were then washed in counter flowing water, neutralized in a basic ammonium hydroxide solution, washed, and then dried on drier drums

*Table II.—Test data obtained from two types of furnishes*

| Tests On— | Handsheets Made from F.S. Waterleaf | | | Handsheets Made from Unbeaten Bl KVP J.P. | | |
|---|---|---|---|---|---|---|
| | Raw Handsheets | Parchment Handsheets | B Parchment Handsheets | Raw Handsheets | Parchment Handsheets | B Parchment Handsheets |
| Type of Fiber in Handsheet | Disintegrated F.S. Waterleaf | | | Unbeaten Bl KVP J.P. | | |
| Freeness [1] | | | | 700 | 700 | 700. |
| Method of Parchmentizing | | Lab machine | Lab machine | | Lab machine | Lab machine. |
| Parchmentizing Solution | | Normal parchmentizing solution. | New parchmentizing solution B. | | Normal parchmentizing solution. | New parchmentizing solution B. |
| Basis Wt.[2] | 36.5 | 41.6 | 39.0 | 39.5 | 45.2 | 42.1. |
| Dry Burst | 35.0 | 43.0 | 52.4 | 29.6 | 65.0 | 72.8. |
| Wet Burst | | 17.3 | 61.0 | | 37.0 | 29.6. |
| Tear 16 (AMD) | 52.0 | 20.0 | 44.0 | 104.4 | 37.0 | 60.0. |
| Color | Blue/white | Yellow/white | Blue/white | Blue/white | Yellow/white | Blue/white. |
| Opacity | 71.0 | 41.0 | 63.0 | 73.0 | 37.0 | 65.0. |
| Curl | | Badly | Slight | | Badly | Very slight. |
| TAPPI Greaseproofness in seconds | | Approximately equivalent | | | Approximately equivalent | |

[1] "Freeness" indicates relative rate at which water drains from pulp—TAPPI Method T 227.
[2] "Basis Wt." indicates weight in lbs. per 3,000 square feet.

columns (2) and (4) of Table I, which is the "B" parchment compared with normal parchment, both produced from machine-made F.S. waterleaf sheets. Table IV com-

[2] Bl KVP J.P. indicates Bleached KVP Jack Pine Pulp.

as described above. The three finished samples had a basis weight of 27.9, 28.3, and 28.7 pounds, respectively. The control limits established for this type of paper are 26.1–28.9 pounds and acceptance limits 25.4–29.6 pounds. As is apparent, the samples were well within these ranges.

The dry burst strengths were 21, 23 and 22, and wet burst strengths were 7.7, 7.5 and 7.5 respectively. The established acceptance limits are 7–13. The tear strength averages were 17, 18 and 22, with a 17 minimum acceptance limit. No pinholes were encountered. The caliper of the finished parchment sheets were 2.1, 2.1 and 2.15 mils, respectively. The Tappi greaseproofness value averaged 1002 seconds.

EXAMPLE 5

A test run was carried out utilizing two samples of 35 lb. weight waterleaf paper with the same commercial apparatus, parchmentizing agent, and method described in Example 4. The contact time was about forty seconds. The basis weights of the samples were 33.4 and 34.5, as against control limits of 33.2–36.8 pounds and acceptance limits of 32.4–37.6 pounds. The dry burst strengths were acceptable. The wet burst strengths were 7.0 and 7.8 as against control limits of 11–17, and acceptance limits of 10–18. The tear strength averages were 26 and 29 with control limits of 26–38 and a minimum acceptance limit of 24. No pinholes were encountered. The samples had excellent acceptance for pen ink without sizing. The measured calipers were 2.6 and 2.6 mils.

EXAMPLE 6

Utilizing the method and equipment of Example 4 above, and type A parchmentizing agent also described above, samples of 55-pound weight greeting-card stock were parchmentized utilizing a contact time of 58 seconds. The basic weights of the parchmentized stock samples were 55.6 and 55.7 pounds, with control limits of 52.2–57.8 and acceptance limits of 50.9–59.1 pounds. The dry burst strengths were 60 and 68, with control limits of 50–76 and a minimum acceptance limit of 47. The wet burst strengths were 15 and 18, with usual control limits of 25–37 and minimum acceptance limit of 23. The tear strength averages were 64 and 63, with control limits of 48–72, and a minimum acceptance limit of 44. No pinholes were observed. The stock had excellent acceptance for pen ink without any sizing. Calipers were 4.0 and 3.2 mils, with control limits of 3.6–4.2 mils and acceptance limits of 3.5–4.3 mils.

The applicant does not illustrate his machines or apparatus for practicing the method, as such machines are known in the parchmentizing industry, and in general they comprise a tank dimensioned to receive a substantial quantity of the parchmentizing solution, means for translating a web of paper to be parchmentized into and out of the solution, or submerging the same within the solution for a predetermined period resulting in the desired degree of parchmentizing, and promptly thereafter washing the web to remove the solution carried thereby, and drying. The applicant's preferred method, e.g., comprises the steps of submergingly translating a web of paper to be parchmentized through a solution of 85% ortho-phosphoric acid and dissolved cellulose, desirably in the ratio of approximately six grams of dissolved cellulose to each 550 cc. of the ortho-phosphoric acid, and at a speed which results in a contact time of the paper with the acid as it is being translated in or through the parchmentizing solution for a period of approximately fifteen to sixty seconds, preferably twenty to forty seconds, washing the so treated web as it is being translated to remove therefrom the phosphoric acid carried thereby, and subjecting the web to drying. The amount or percentage of dissolved cellulose in the parchmentizing solution may be varied, but a preferred range is desirably in the ratio of three to six grams of the dissolved cellulose to approximately 550 cc. of the phosphoric acid. It will be understood that the time factor, that is, the length of time the paper is subjected to the phosphoric acid and cellulose solution, varies according to the degree of parchmentizing desired, but it is repeated that the parchmentizing is commonly done to a more or less standardized degree.

To further summarize, paper produced by the applicant's method is greatly superior in opacity and dry burst, especially after exposure to heat, and substantially superior in other respects as compared with commercial types of parchment paper, with the exception that the wet burst resistance is less than that of parchmentized paper produced by the heretofore used parchmentizing processes. As stated, the applicant's method is adapted to produce parchmentized paper having the desirable qualities as hereinbefore stated at high speed, that is, the web of paper is translated at high speeds and the tank or receptacle containing the same is such that the web of paper is preferably translated through the solution so that it is subject to the parchmentizing action of the solution during a contact time on the order of fifteen to sixty seconds. The parchmentizing solution and the time to which the paper is subjected thereto hereinbefore stated is commercially practical for producing the parchmentized paper having the high grade qualities enumerated. While the use of phosphoric acid as a parchmentizing agent improves the parchmentized product, the inclusion or the dispersion of the cellulose in the phosphoric acid parchmentizing solution still further adds to the quality of the product. Also as mentioned, the applicant's method may be practiced by apparatus of the type which has been heretofore used in parchmentizing paper by use of sulphuric acid, but the applicant's method and parchmentizing solution results in a product superior to that produced by the use of sulphuric acid as a parchmentizing agent.

The advantages of the parchment products of the present invention, produced in the presence of added cellulose, as compared to normal parchment made from the same furnish, may be tabulated as follows:

(1) Dry burst—increased by approximately 10 to 22%.

(2) Wet burst—decreased by approximately 8 to 20%.

(3) Tear resistance—increased by approximately 62 to 120%.

(4) Opacity—always very close to the original waterleaf, an increase over normal parchment of 51 to 76%.

(5) TAPPI—greaseproofness—equal or superior to normal parchment.

(6) Tendency to curl—practically none.

(7) Heat resistance—superior to normal parchment.

(8) Color—white to blue-white compared with a yellow-white hue for normal parchment.

The parchment products of the invention may be used in the same manner and in the same applications as other parchment products, as in the wrapping of greasy materials, and especially in such applications as require or prefer the aforesaid advantages of the parchment products of the present invention.

Although phosphoric acid of about eighty percent concentration may be employed according to the invention, the usual about 85% or greater concentration is preferred. Likewise, although submerging translation of the material to be parchmentized through the parchmentization reaction medium is a preferred procedure, it will be apparent that submerging, or dipping, or spraying of the material may be employed, or that the material may be passed between rolls wetted with the parchmentizing agent, or that the material may be parchmentized from one side only as by an engraved roll, or that other suitable procedure may be employed, in each case to effect a sufficient contact time of the parchmentizing agent with the material being parchmentized to produce the desired parchmentization.

Various modifications may be made in the process and the products of the present invention without departing from the spirit or scope thereof, and it is therefore to be understood that the invention is limited only by the scope of the appended claim.

I claim:

Parchment sheet-form paper containing integrally interbonded parchmentized cellulose fibers non-indigenous to the main body of the paper, produced by the parchmentization of a water-absorbent paper sheet by contact with substantially pure liquid ortho-phosphoric acid of parchmentizing strength of at least approximately 80% concentration for a period of about 20 to 40 seconds, in the presence of 0.1 to 2% added cellulose by weight based on the weight of ortho-phosphoric acid, at least some of which cellulose is in solution in said acid, characterized by a high degree of opacity, dry burst, tear and heat resistance, and diminished tendency to curl when compared with paper parchmentized in the same parchmentization medium in the absence of added cellulose and characterized by a high degree of opacity, dry burst and tear resistance and diminished tendency to curl when compared with paper parchmentized by the use of sulfuric acid as parchmentizing agent.

References Cited

UNITED STATES PATENTS

| | | | |
|---|---|---|---|
| 114,880 | 3/1871 | Taylor et al. | 8—115.6 |
| 198,382 | 12/1877 | Hanna et al. | 8—119 |
| 420,615 | 2/1890 | Andrews | 8—118 |
| 1,390,292 | 3/1919 | Huey | 8—118 |
| 1,519,376 | 2/1924 | Huey | 8—118 |
| 1,775,319 | 9/1930 | Muller | 8—118 |
| 2,067,501 | 1/1937 | Newman | 8—115.6 |
| 2,516,083 | 1/1950 | Weiss | 8—118 |

NORMAN G. TORCHIN, *Primary Examiner.*

J. CANNON, *Assistant Examiner.*